(12) United States Patent
Gingras

(10) Patent No.: US 8,511,325 B2
(45) Date of Patent: Aug. 20, 2013

(54) WASTE CONTAINER WASHING VEHICLE

(75) Inventor: Serge Gingras, St-Ubalde (CA)

(73) Assignee: 9103-8034 Quebec Inc., Saint-Casimir, Quebec (CA)

( * ) Notice: Subject to any disclaimer, the term of this patent is extended or adjusted under 35 U.S.C. 154(b) by 277 days.

(21) Appl. No.: 12/349,917

(22) Filed: Jan. 7, 2009

(65) Prior Publication Data
US 2010/0170537 A1 Jul. 8, 2010

(51) Int. Cl.
*B08B 9/093* (2006.01)
*F04B 17/00* (2006.01)

(52) U.S. Cl.
USPC ........... 134/95.3; 134/52; 134/53; 134/115 R; 134/148

(58) Field of Classification Search
USPC .............. 134/52, 78, 104.1, 107, 115 R, 148, 134/166 R, 167 R, 53; 15/56; 422/302, 303
See application file for complete search history.

(56) References Cited

U.S. PATENT DOCUMENTS

| 3,203,437 | A |   | 8/1965  | Faust    |          |
|-----------|---|---|---------|----------|----------|
| 3,291,144 | A |   | 12/1966 | Diamond  |          |
| 3,604,038 | A |   | 9/1971  | Di Ilio  |          |
| 3,881,950 | A | * | 5/1975  | Pettit   | 134/115 R |
| 3,901,255 | A |   | 8/1975  | Pettit   |          |
| 4,211,745 | A | * | 7/1980  | Boyd     | 422/28   |
| 4,242,311 | A |   | 12/1980 | Middaugh |          |
| 4,485,513 | A |   | 12/1984 | Eskelinen |         |
| 4,694,846 | A |   | 9/1987  | Bouchard |          |
| 5,964,229 | A |   | 10/1999 | Brendel  |          |
| 6,336,239 | B1|   | 1/2002  | Cooper   |          |
| 6,554,008 | B2| * | 4/2003  | Dewey et al. | 134/22.18 |
| 7,003,843 | B1|   | 2/2006  | Moore    |          |
| 7,225,816 | B2| * | 6/2007  | Byers    | 134/22.1 |
| 7,398,789 | B1|   | 7/2008  | Herrera  |          |
| 2003/0037805 | A1 |   | 2/2003 | Mathieu  |          |
| 2004/0159336 | A1 | * | 8/2004 | Feistmantl | 134/18 |
| 2006/0042660 | A1 | * | 3/2006 | Byers    | 134/22.1 |
| 2008/0089764 | A1 |   | 4/2008 | Vistro   |          |
| 2008/0105761 | A1 |   | 5/2008 | Amestroy et al. |   |

FOREIGN PATENT DOCUMENTS

DE 29923267 9/2000
GB 2298359 A * 9/1996

* cited by examiner

*Primary Examiner* — Michael Kornakov
*Assistant Examiner* — Benjamin L Osterhout
(74) *Attorney, Agent, or Firm* — Sutherland Asbill & Brennan LLP

(57) ABSTRACT

With the waste container washing system described herein, the waste container can be moved into a washing compartment of the washing vehicle for washing thereof; in a first washing phase, the waste container can be exposed to a plurality of water jets of grey water pumped from a grey water reservoir; and in a second washing phase, the waste container can be exposed to a plurality of clean water pumped from a clean water reservoir. The water used in the first and/or second washing phase can be collected and stored in the grey water reservoir. Other improvements, such as a double-action pump for the two phases, a filtering system for grey water, a container movement system and path, and methods are also described.

26 Claims, 7 Drawing Sheets

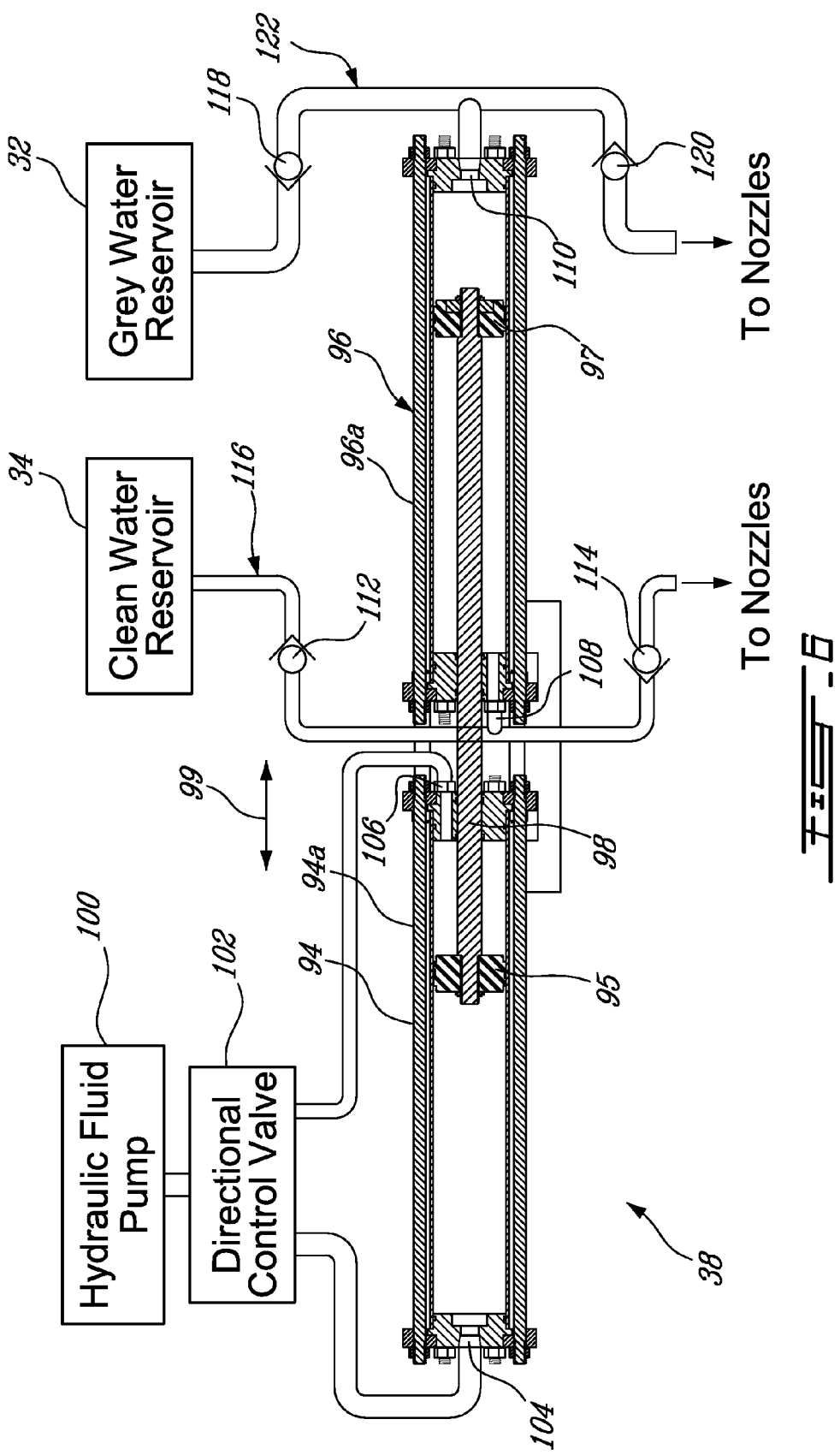

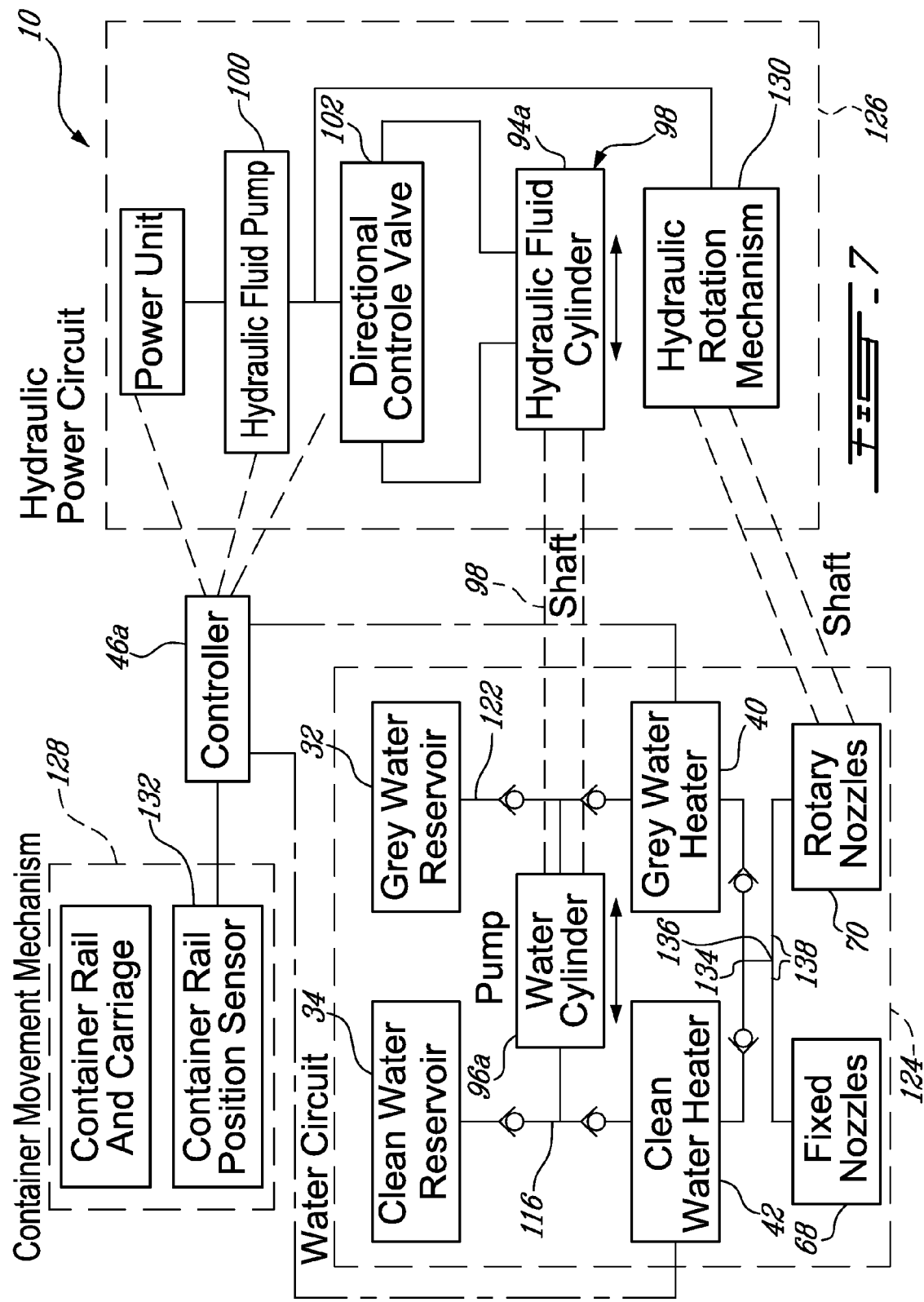

WASTE CONTAINER WASHING VEHICLE

FIELD

The specification generally relates to the field of waste collection, and more specifically describes washing vehicle for washing waste containers after collection of waste therefrom.

BACKGROUND

In an effort to achieve a higher degree of automation in domestic and commercial waste collection, such as garbage and recyclable material collection for instance, many cities have encouraged the use of standardized waste containers which can be mechanically picked up and emptied into an associated garbage truck or recycling truck, for instance, which is mechanically adapted for handling the waste container. This has rendered automated washing of containers more accessible.

An example of a vehicle which is specifically adapted to clean waste containers in a highly automated manner is described in published US Patent application no. 2008/0105761 (Pierre Amestoy et al.).

One main challenge in rendering waste container washing vehicles commercially appealing resides in increasing the autonomy thereof—i.e. the amount of waste containers washable, or wash cycles, between servicings—because of the substantial amount of machine/operator time and fuel required to send the waste container washing vehicle to servicing and return it to its waste container washing route. Increasing the maximum amount of washing water the washing vehicle carries poses practical limits. A challenge thus resides in using less washing water for each washing cycle while achieving a washing of a satisfactory quality.

Using a limited amount of water for each washing cycle has been addressed, for example in aforementioned publication no. US 2008/0105761, by using a finite number of spray washing nozzles at predetermined positions, and by positioning spray washing nozzles on a rotary head to achieve a generally uniform washing on 360° inside the waste container.

Generally, although known waste container washing vehicles were satisfactory to a certain degree, there remained room for improvement in achieving combined results of high autonomy and high washing quality, as well as overall operability.

SUMMARY

As it will appear from the detailed description provided below, an improved combination of high autonomy and high washing quality can be obtained by using a wash cycle which has two washing phases: a first washing phase using water collected from a previous washing cycle (herein referred to as grey water for simplicity and convenience), and a second washing phase using clean water from a clean water reservoir.

In accordance with one aspect, there is provided a method of washing a waste containers in a highly automated manner with a waste container washing vehicle, the method comprising:

moving the waste container into a washing compartment of the washing vehicle for washing thereof, in a first washing phase, exposing the waste container to a plurality of water jets of grey water pumped from a grey water reservoir;

in a second washing phase, exposing the waste container to a plurality of clean water pumped from a clean water reservoir; and storing used water from the first washing phase and the second washing phase in the grey water reservoir.

In accordance with another aspect, there is provided a waste container washing vehicle comprising:

a clean water reservoir;

a container washing compartment having a plurality of water nozzles arranged for washing a waste container positionable therein;

a grey water reservoir which receives water previously used by the nozzles during waste container washing;

a water pumping circuit operable to pump water to the nozzles selectively from either one of the clean water reservoir and the grey water reservoir.

The waste container positioned in the washing compartment can thus be washed with a two-phase cycle, a first phase during which water is pumped to the nozzles from the grey water reservoir, and a second phase during which water is pumped to the nozzles from the clean water reservoir.

In accordance with another aspect, there is provided a double-action pump comprising a first and a second separate cylinders, each cylinder having two longitudinally opposite ports, one at each end thereof, and each cylinder having a corresponding piston slidably engaged therein; both pistons being interconnected for common sliding displacement in and relative to the cylinders; the pistons being selectively hydraulically displaceable in two longitudinally opposite directions by selective feeding of hydraulic fluid in a first one of two opposing ones of the ports during emptying of hydraulic fluid from a second one of the two opposing ports, thereby pumping fluid respectively in and out through a first one and a second one of the two other opposing ones of the ports, and vice versa by feeding of hydraulic fluid in the second one of the two opposing ports.

In accordance with another aspect, there is provided a filtering compartment positioned below a washing compartment used water collecting reservoir, the filtering compartment having an upper opening in a bottom portion of the used water collecting reservoir, the filtering compartment having a lower settling chamber in liquid flow communication with the used water collecting reservoir through a conduit leading to the upper opening, a filtering chamber positioned above the settling chamber, partitioned from the conduit, and being in fluid flow communication with the settling chamber through a coarsely filtering mesh or grating, and a grey water port in the filtering chamber, for pumping grey water therefrom to water nozzles in the washing compartment.

In accordance with another aspect, there is provided a waste container washing vehicle comprising a guide rail having a waste container carriage movably mounted to it to carry a waste container along a washing path leading into, and back out from a container washing compartment of the vehicle, the waste container washing path having:

a starting position in which the waste container is attachable to the carriage in an upright orientation with a lid thereof pivoted in an open position, outside the washing compartment, from which starting position the waste container is raised by the carriage as it is moved upwardly along the guide rail along a first portion of the washing path, a second portion of the washing path where the carried waste container is flipped over a correspondingly curved portion of the guide rail, into the washing compartment in an upside-down orientation where the waste container lid is maintained in the open position by abutment against an appropriately positioned lid guide, a third portion where the carried waste container is moved downwardly in the washing compartment and submitted inside and outside thereof to water jets by the water nozzles along its entire height, including an exposed inside portion of the lid, until the container lid is freed from the lid guide and allowed to pivot downwardly under its own weight, which exposes a portion of the container formerly covered by the lid to the water jets and exposes the outer portion of the lid.

In accordance with another aspect, there is provided a method of washing a waste container comprising, in sequence, placing the waste container in an upright orientation with a lid thereof in an open position;

moving the waste container upwardly along a first portion of the washing path;

flipping the waste container into an upside-down orientation while maintaining the lid in the open position, along a second portion of the washing path; and lowering the upside-down waste container while exposing both the inside thereof and outside thereof, along its entire height to fixed-height water jets, including an exposed inside portion of the lid until the container lid is allowed to pivot under its own weight and exposes a formerly covered portion of the container to the water jets, along a third portion of the washing path.

It will be understood that the expression waste container as used herein is to be interpreted broadly such as encompassing any suitable type of waste container, waste bin, waste cart, etc.

Further, it will be understood that the expression clean water as used herein is to be interpreted broadly in relation with an associated reservoir and can include, for example, detergent dissolved therein.

DESCRIPTION OF THE FIGURES

FIG. 6 is a schematic cross sectional view taken along lines 6-6 of FIG. 5;

FIG. 7 is a block diagram of the waste container washing system shown in FIG. 1.

DETAILED DESCRIPTION

Figure 1:
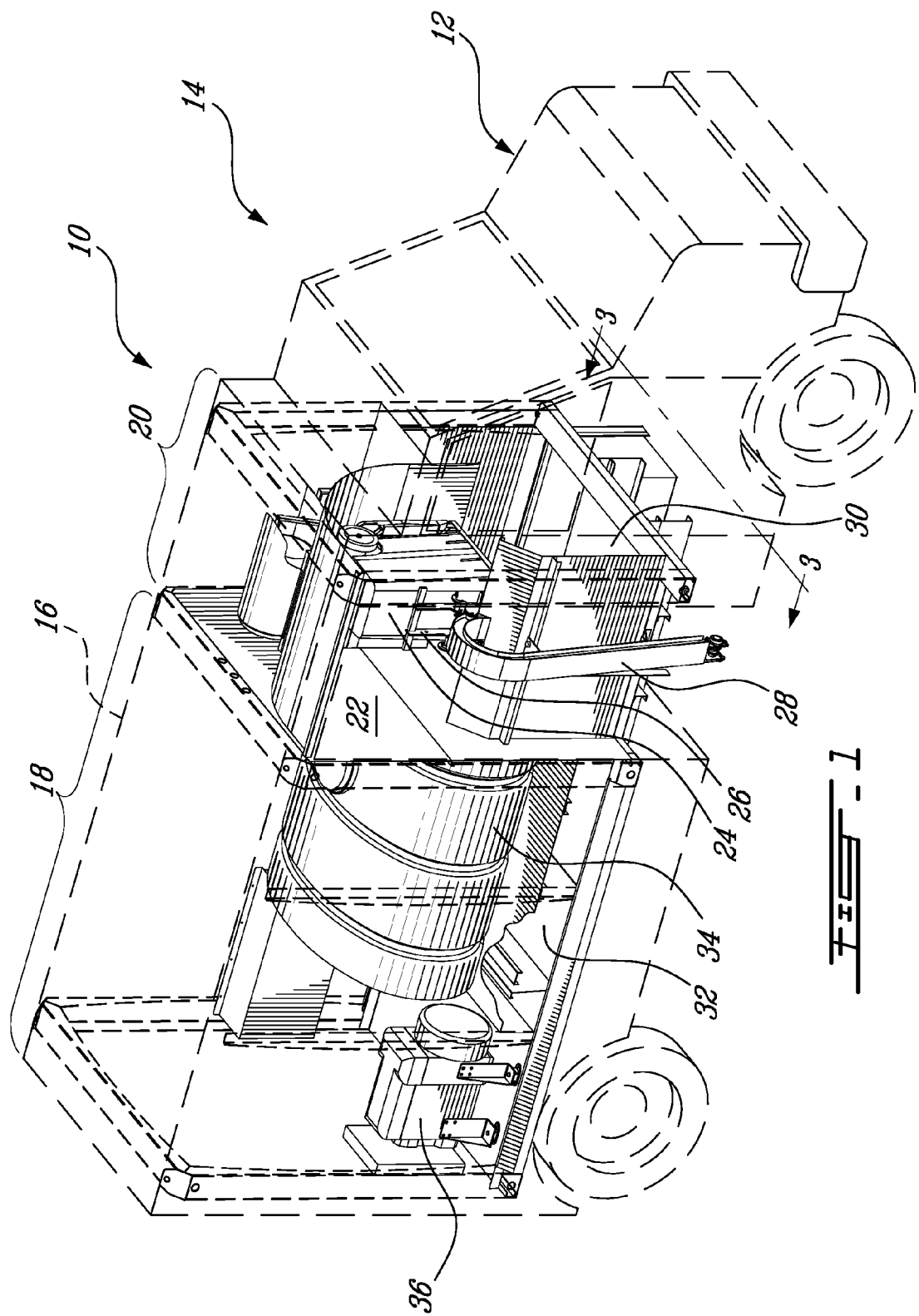
FIG. 1 is a perspective view taken from the right side, showing a waste container washing system for a vehicle.

FIG. 1 shows an example of a waste container washing system 10 in a vehicle 12, referred to herein as a waste container washing vehicle 14. The box 16 of the vehicle 12 is separated in a rear compartment 18 and a front compartment 20. The front compartment 20 is used as a container washing compartment 22, where a waste container 24 is mounted onto a carriage 26, and moved along a curved rail 28 to be washed upside down by a plurality of nozzles (not shown in FIG. 1). In the depicted washing system 10, water sprayed by the nozzles during washing of the waste container 24 is collected at the bottom 30 of the container washing compartment 22 and in a reservoir 32 referred to herein as a grey water reservoir 32. A separate clean water reservoir 34 is provided in the rear compartment 18 of the vehicle box 16. In this embodiment, the grey water reservoir 32 extends below the clean water reservoir 34 into the rear compartment 18 of the box 16, from the bottom 30 of the container washing compartment 22.

As it will appear from the description below, a significant increase in washing water efficiency can be achieved with the system 10, which cleans the waste container 24 in a two-phase cycle. In the first phase, the waste container 24 is washed with water from the grey water reservoir 32, and in the second phase, the waste container 24 is washed with clean water from the clean water reservoir 24, before being carried out from the container washing compartment 22 by the carriage 26 and rail 28 mechanism. Also shown in FIG. 1, a diesel engine 36, the use of which will be described further below.

Figure 2:
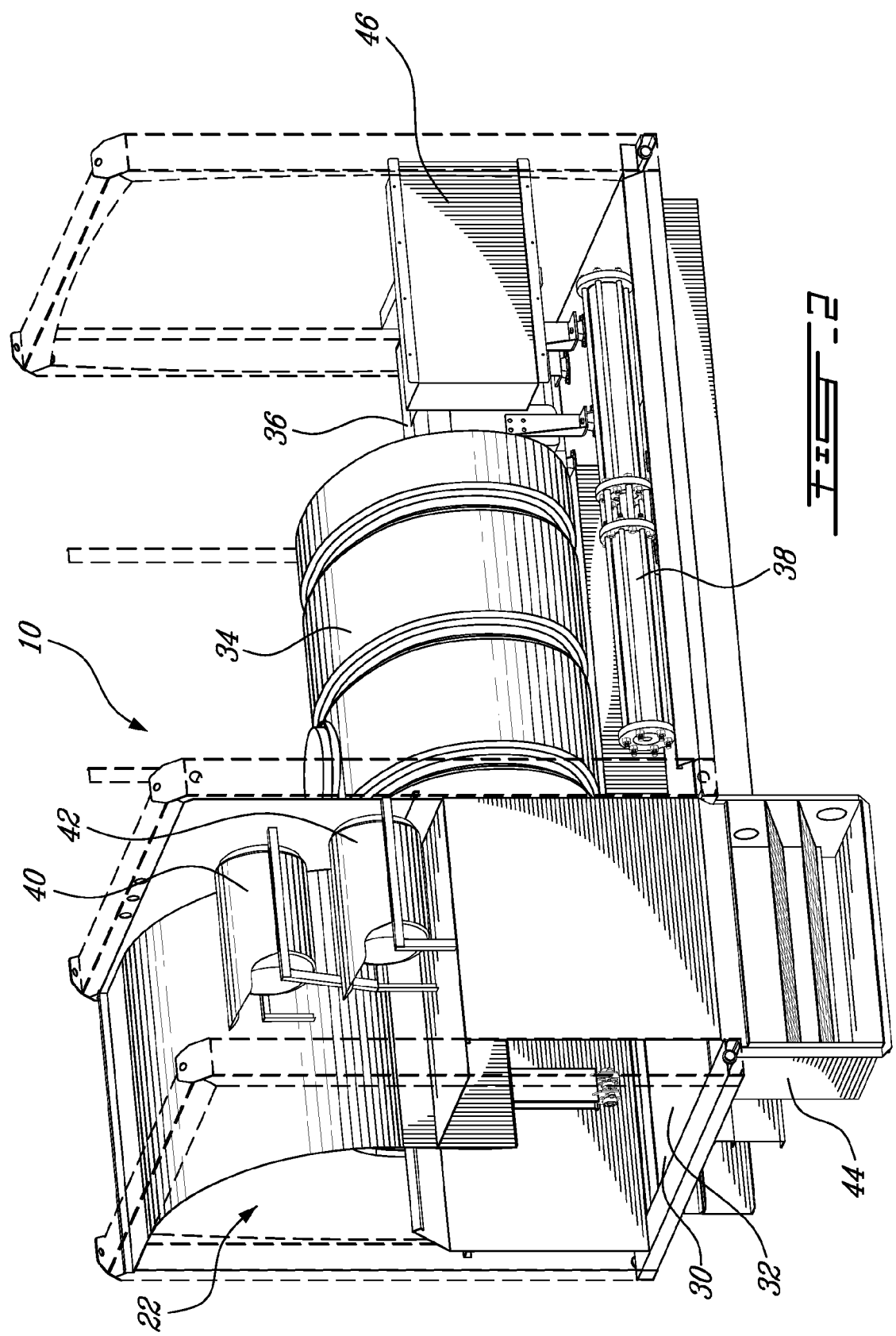
FIG. 2 is a perspective view of the left side of the waste container washing system of FIG. 1.

Turning now to FIG. 2, the other side of the waste container washing system 10 is shown. In this embodiment, as will be detailed further below, grey water and clean water are selectively fed to the waste container washing nozzles using a hydraulic double-action pump 38. The diesel engine 36 is used to power a hydraulic fluid pump (not shown) which drives the double-action pump 38 and the other hydraulics of the system 10. In order to allow a relatively rapid switch between grey water and clean water at the nozzles, clean water and grey water are carried to the nozzles using two distinct water lines, which meet and then split off to the different nozzles at a location which is positioned physically close to the nozzles. Henceforth, two distinct water heaters are used, a grey water heater 40, associated with the grey water line (not shown), and a clean water heater 42, associated with the clean water line (not shown). A filtering compartment 44, the details of which will be provided further below, is provided below the grey water reservoir 32, and grey water pumped from the grey water reservoir 32 is roughly filtered by passing through the filtering compartment 44. FIG. 2 also shows a controller unit 46 which is used to highly automate the waste container washing system 10.

Figure 3:
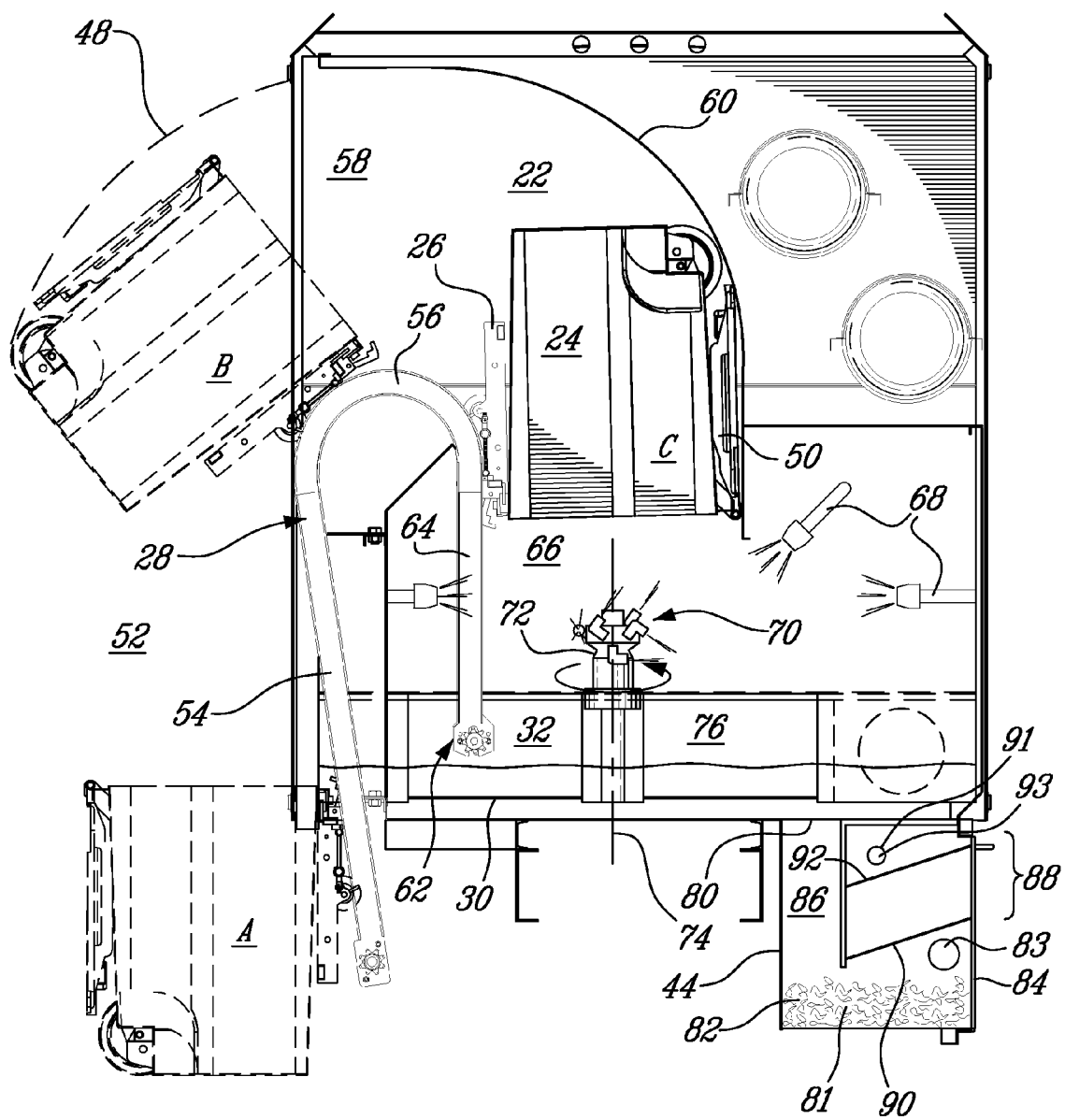
FIG. 3 is a cross-sectional view taken along lines 3-3 of FIG. 1.

Turning now to FIG. 3, the washing compartment 22 and filtering compartment 44 are shown in greater detail. In operation, a waste container 24 is attached to a carriage 26 which is carried along the rail 28, and the carriage 26 can thus carry the waste container 24 along a container washing path 48. The waste container 24 is first attached to the carriage 26 in a first position A in an upright orientation, with the lid 50 of the waste container 24 in an open position. The waste container 24 is then carried upwardly along a first portion 52 of the container washing path 48 which roughly coincides with a first straight portion 54 of the guide rail 28, and to a second position B. The carriage 26 then moves on to a curved second portion 56 of the guide rail 28, and thus moves the waste container 24 along a second portion 58 of the container washing path 48, where the waste container 24 is flipped upside down and taken into the container washing compartment 22. When the waste container is in the upside-down position shown in FIG. 3, the waste container lid 50 is prevented from pivoting downwardly under the action of its own weight by an appropriately positioned lid guide 60. The guide rail and carriage assembly, or mechanism, includes a position sensor (not shown) which allows the controller unit 46 (FIG. 2) to time the starting of the water jet emission by the nozzles with pre-determined positions of the waste container 24 along the container washing path 48. For example, the beginning of emission of water jets of grey water can roughly coincide with the position C in which the waste container is shown in solid lines in FIG. 3, and the water jets can continue as the waste container is carried downwardly along the straight third portion of the rail 64, down the third portion 66 of the container washing path 48.

As it can be seen in FIG. 3, there are two sets of fixed-height washing nozzles. A first, fixed set 68 is provided which has a plurality of nozzles at fixed locations in the container washing compartment 22. The fixed set 68 of water nozzles are used to wash the outside of the waste container 24 along its entire height as the waste container 24 is carried downwardly into the third portion 66 of the container washing path 48. Although only three of such nozzles are shown in FIG. 3, it will be noted here that the illustrated embodiment actually has 6 fixed nozzles 68 interspaced around the third portion 66 of the container washing path 48. In alternate embodiments, various alternate nozzle arrangements can be used. A second, rotary set 70 of water nozzles are positioned on a rotary head 72, roughly in the axial center of the third portion 66 of the container washing path 48. The rotary head 72 is also at a fixed height, but rotates around a vertical axis 74. The washing nozzles 70 on the rotary head 72 act to wash the interior of the waste container 24 as the latter is moved in the third portion 66 of the container washing path 48.

Figure 4:
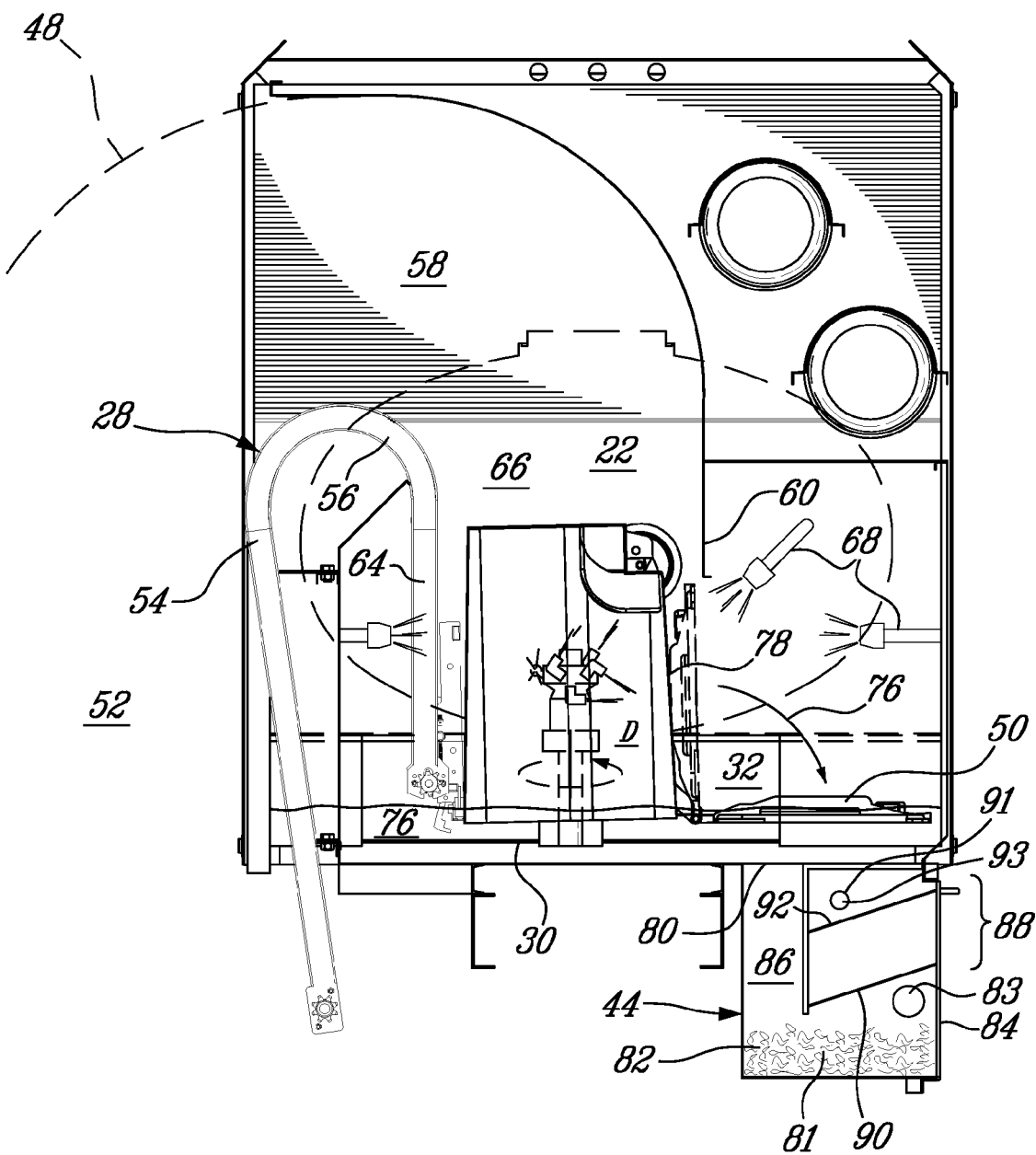
FIG. 4 is a view similar to FIG. 3 showing the waste container in an other position.

Turning to FIG. 4, the waste container 24 is shown at a position D in the third portion 66 of the container washing path 48. In this position D, the lid 50 of the waste container 24 is freed from the lid guide 60 and allowed to pivot 76 downwardly under its own weight, which exposes a formerly covered portion 78 of the outside of the waste container 24 to the water jets 68. The selection between grey water and clean water can be timed to switch at a waste container position roughly coinciding with the position D shown in FIG. 4. Henceforth, the controller unit 46 can then switch the double-action pump 38 (FIG. 2) to pump clean water from the clean water reservoir 34 out from the nozzles 68, 70. The second phase of the washing cycle thus starts. The waste container 24 is carried back upwardly along the rail 28 back towards a position C, shown in FIG. 3, while it is being washed with clean water and thus providing a finish cleaning of a relatively high quality to the waste container 24. As the waste container 24 is being carried back upwardly, the lid 50 hangs downwardly under its own weight. The waste container 24 is then moved back along the second portion 58 and first portion 52 of the container washing path 48, back to the starting position A, during which time the movement of the waste container 24 contributes to pivot the lid 50 closed, by action of its own weight. The container 24 can then be removed from the carriage 24, entirely washed both inside and outside by the two washing cycles, with the lid 50 already back into the closed position.

FIGS. 3 and 4 also show the filtering compartment 44 in greater detail. The filtering compartment 44 is positioned below the grey water reservoir 32, in a matter that washing water 76 collected from cleaning of the waste container 24 can be conveyed therein by gravity. An significant amount of floating debris which can be present in the grey water 76 at the bottom 30 of the container washing compartment 22, will be kept afloat on the grey water 76, and thereby be kept from entering the filtering compartment 44. This separation of floating debris thus constitutes a first filtering step of the filtering compartment 44. The filtering compartment 44 has an upper opening 80 in the bottom portion 30 of the grey water reservoir 32. The filtering compartment 44 has a settling chamber 82 at the bottom thereof, in which sinking debris 81 are collected in a second filtering step. A drain 83 is provided in an upper portion of the settling chamber 82. At the end of a day, or during servicing, the grey water 76 can be emptied through the drain 83, and a service panel 84 of the filtering compartment 44 can be removed, and the settled debris 81 shoveled out. The settling chamber 82 communicates with the upper opening 80 and the grey water reservoir 32 via a conduit 86. The filtering compartment 44 has a filtering chamber 88 which is partitioned from the conduit 86, and which is in fluid flow communication with the settling chamber 82 through a first coarsely filtering mesh, such as a screen or grating 90. A grey water outlet 91 leading to the double-action pump 38 (FIG. 2) is positioned in the filtering chamber 88. A second mesh 92, finer than the first mesh 90, can be used between the first mesh 90 and the grey water outlet 91. Further, in this embodiment, a third mesh 93 which is finer than both the first mesh 90 and second mesh 92, is positioned at the entrance of the grey water outlet 91. The first coarsely filtering mesh, the second mesh, and the third mesh, contribute to successively filter any remaining debris which were not kept floating on the grey water level 76 or settled in the settling chamber 82, in a subsequent filtering step. Experimenting with this filtering system has shown a relatively high degree of autonomy of the filtering system, i.e. at least as long in term of number of washing cycles than the average time it takes to empty the clean water reservoir 34.

Figure 5:
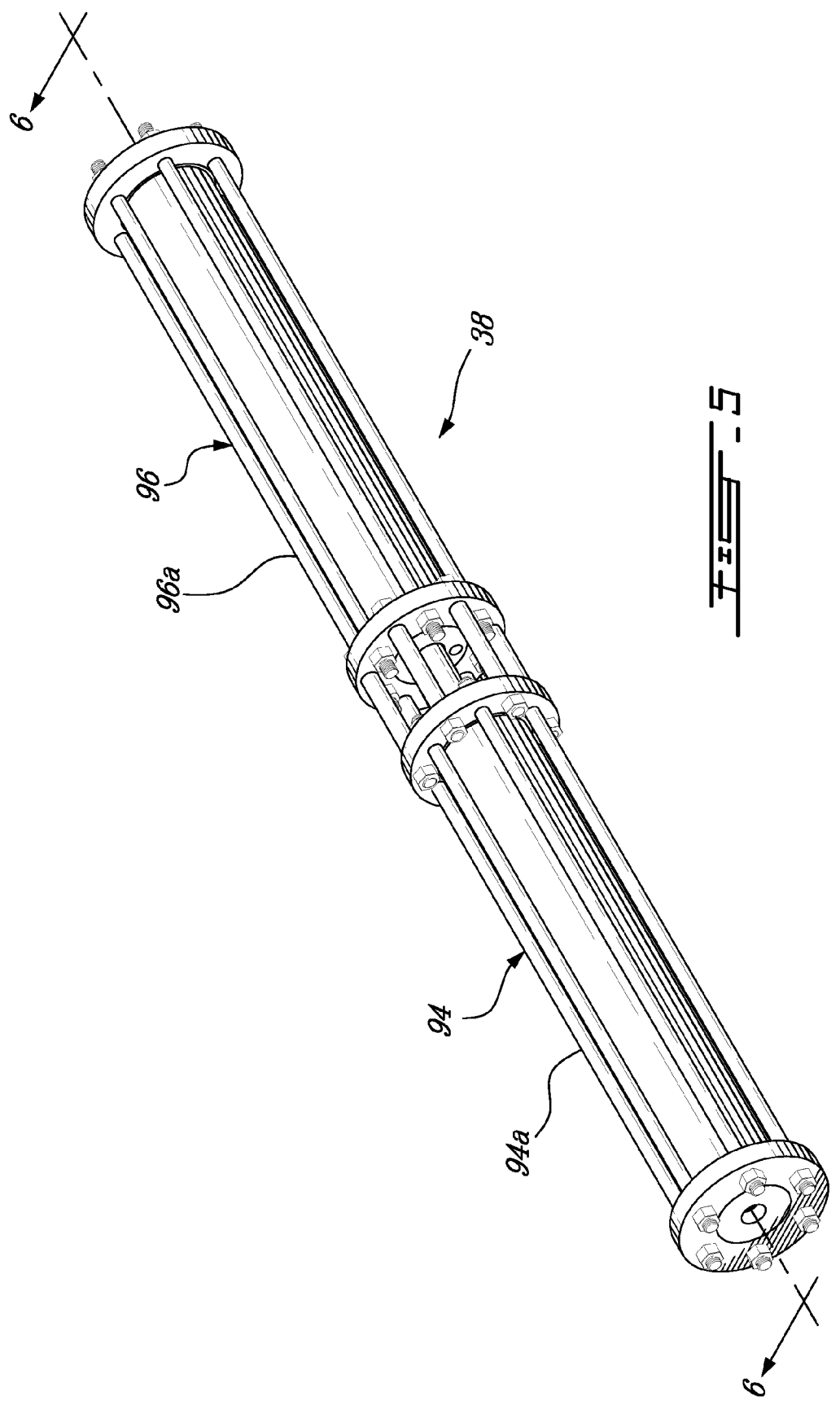
FIG. 5 is a perspective view of a double-action pump used in the system of FIG. 1.

Turning now to FIG. 5, the double-action pump 38, which is used to provide the two distinct phases of the washing cycle in this embodiment, is shown in greater detail. In this embodiment, the double-action pump 38 has a first cylinder 94 and a second cylinder 96 which are separated from one another and longitudinally aligned. In this embodiment, the first cylinder 94 is a hydraulic fluid cylinder 94a, whereas the second cylinder 96 is a water pumping cylinder 96a.

The details of the double-action pump 38 are shown in greater detail in FIG. 6. A first piston 95 and a second piston 97 are provided in the corresponding cylinders 94, 96. Each cylinder 94, 96 has two longitudinally opposed ports, at opposite ends thereof. The two pistons are interconnected with a longitudinally oriented shaft 98, in a matter that they are displaced commonly inside the cylinders 94, 96 and relative to the cylinders, in the longitudinal orientation 99.

In operation, a hydraulic fluid pump 100 provides hydraulic fluid to a directional control valve 102, which selectively allows hydraulic fluid into the first port 104, or second port 106, of the hydraulic fluid cylinder 94a, depending on whether it is desired to pump clean water from a clean water reservoir 34, or grey water from a grey water reservoir 32 to the nozzles. For example, pumping hydraulic fluid into the second port 106 while hydraulic fluid is drained, or emptied from the first port 104 will result in displacing the first piston 95 towards the first port 104 of the hydraulic fluid cylinder 94a. The shaft 98 will thereby drive the second piston 97, in the water pumping cylinder 96a, toward a first, clean water port 108 of that cylinder 96a as well. The second piston 97 will thus force clean water out from the second cylinder 96 and to the nozzles, due to appropriately oriented clean water check valves 112, 114 provided before and after the second cylinder 96 in the clean water line 116. While the second piston 97 pumps clean water to the nozzles, through the clean water port, it will also pump grey water from the grey water reservoir 32 into the second cylinder 96 through a second, grey water port 110 of that cylinder 96, by an arrangement of grey water check valves 118, 120, in the grey water line 122. And vice-versa, if the directional control valve 102 allows hydraulic fluid to be forced into the first port 104 of the hydraulic cylinder 94a, the first piston 95 will be displaced towards the second port 106 of the same cylinder 94a, which will drive the second piston 97 towards the right, and thereby pump grey water out to the nozzles while clean water will be pumped into the second cylinder 96 by the second piston 97.

It will be understood that the particular configuration of ports shown herein is provided for illustrative position only, and that alternate embodiments can be used instead. For example, the direction of pumping for the clean water reservoir and the grey water reservoir can be inversed. Even further, hydraulic fluid can be pumped into the first port of the first cylinder or the second port of the second cylinder, as opposing ports, for example, whereas the clean water line can be connected to the second port of the first cylinder and the grey water line can be connected to the first port of the second cylinder as two other opposing ports. Even further, it was found mechanically practical to align both cylinders and interconnect them using a shaft, although in other applications it may be preferred to use two cylinders which are in a disaligned configuration, or which are interconnected otherwise than by a shaft.

Turning now to FIG. 7, an more general view of the washing system 10 is shown as block diagram, which shows the different interactions between the water circuit 124, the hydraulic power circuit 126, the container movement mechanism 128 and the controller unit 46a in the exemplary embodiment. As many of these elements were presented above, only several ones will be discussed in further detail. In particular, it will be understood that the hydraulic fluid pump 100 is driven by a power unit, which can be a diesel engine 36 such as depicted in FIG. 1. The hydraulic fluid pump 100 is used to feed hydraulic fluid pressure to all the hydraulic components of the system 10. These include the hydraulic rotation mechanism 130, for the rotary nozzles 70; the hydraulic fluid cylinder 94a of the double-action pump 38, and the container movement mechanism 128 to drive the carriage 26 along the rail 28. The controller 46a can be used to control the container movement mechanism 128, the diesel engine 36, the hydraulic fluid pump 100, the directional control valve 102, and both the grey water heater 40 and the clean water heater 42, for example. It can receive an input from the container rail position sensor 132 to trigger various events depending on the position of the waste container 24 in the waste container washing path 48. The clean water line 116 and the grey water line 122 are brought together at a junction point 134 which then splits off to the nozzles 68, 70 at a split-off point 136. It can be advantageous to position the junction point 134 as close as practical to the split off point 136, and to position the split off point 136 as close as practical to the nozzles 68, 70 to thus maintain the length of the nozzle hoses 138 as short as possible, to lower the remaining amount of water which remains in the hoses when the pumping is interrupted or switched from clean water pumping to grey water pumping.

For illustrative purposes, in the embodiment described above and illustrated, an autonomy of 600-800 waste containers/washing cycles was achieved, and fine-tuning is worked to achieve an autonomy goal of 1000 washing cycles. With a 1000 gallon clean-water reservoir, this would equate to using only a gallon of clean water per waste container, for a thorough cleaning of both the inside and the outside of the waste container.

It will be understood that the embodiments described above and illustrated are provided for illustrative purposes only, and that various alternate embodiments can be devised from the teachings of this specification. For example, it will be understood that a different movement mechanism for carrying the waste container in the container washing path can be used for different types of waste containers, and that alternate pumps or hydraulic power circuits can be used in alternate embodiments.

The examples described above and illustrated are thus exemplary only. The scope is indicated by the appended claims.

What is claimed is:

1. A waste container washing vehicle comprising
   a clean water reservoir;
   a container washing compartment having a plurality of water nozzles arranged for washing a waste container positionable therein;
   a grey water reservoir which receives water previously used by the nozzles during waste container washing; and
   a water pumping circuit interconnecting both the grey water reservoir and the clean water reservoir to the water nozzles and operable to pump water to the nozzles selectively from either one of the grey water reservoir and the clean water reservoir;
   wherein a waste container positioned in the washing compartment can be washed with a two-phase cycle, a first phase during which water is pumped to the nozzles from the grey water reservoir, and a second phase during which water is pumped to the nozzles from the clean water reservoir, wherein the water pumping circuit comprises a double-action pump having a first and a second separate cylinders, each cylinder having two longitudinally opposite ports, one at each end thereof, and each cylinder having a corresponding piston slidably engaged therein; both pistons being interconnected for common sliding displacement in and relative to the cylinders; the pistons being selectively hydraulically displaceable in two longitudinally opposite directions by selective feeding of hydraulic fluid in a first one of two opposing ones of the ports during emptying of hydraulic fluid from a second one of the two opposing ports,
   thereby pumping grey water and clean water respectively in and out through a grey water one and a clean water one of the two other opposing ones of the ports, and vice versa by feeding of hydraulic fluid in the second one of the two opposing ports.

2. The waste container washing vehicle of claim 1 wherein a directional control valve fed with hydraulic fluid by a hydraulic fluid pump operates the selection from the clean water and the grey water pumping by the selective feeding of hydraulic fluid to a corresponding one of the first and second opposing ports.

3. The waste container washing vehicle of claim 1 wherein the first and second cylinders are longitudinally aligned and the corresponding pistons are mechanically interconnected by a shaft.

4. The waste container washing vehicle of claim 1 wherein the first cylinder is a hydraulic fluid cylinder having the first and second opposing ports, and second cylinder is a water pumping cylinder having the two other opposing ports.

5. The waste container washing vehicle of claim 1 wherein a clean water line connected to the clean water port and a grey water line connected to the grey water port meet at a junction point which leads to the water nozzles, and have corresponding check valves before the junction point.

6. The waste container washing vehicle of claim 5 further comprising a clean water heater along the clean water line and a grey water heater along the grey water line.

7. The waste container washing vehicle of claim 5 wherein a plurality of water lines leading to the water nozzles split off from a split off point, and wherein the junction point is located physically close to the split off point.

8. The waste container washing vehicle of claim 1 wherein the grey water reservoir collects used water at the bottom of the washing compartment.

9. The waste container washing vehicle of claim 1 further comprising a filtering compartment positioned below the grey water reservoir and having an upper opening in a bottom portion of the grey water reservoir, the filtering compartment having a lower settling chamber in liquid flow communication with the grey water reservoir through a conduit leading to the upper opening, a filtering chamber positioned above the settling chamber, partitioned from the conduit, and being in fluid flow communication with the settling chamber through a coarsely filtering mesh or grating, and a grey water outlet in the filtering chamber, wherein the grey water is pumped from the grey water outlet.

10. The waste container washing vehicle of claim 9 further comprising at least a second progressively finer and interspaced mesh between the coarsely filtering mesh and the grey water outlet.

11. The waste container washing vehicle of claim 1 further comprising a hydraulic pump driving engine provided in a compartment of the vehicle separate from the container washing compartment.

12. A waste container washing vehicle comprising:
    a clean water reservoir;
    a container washing compartment having a plurality of water nozzles arranged for washing a waste container positionable therein, wherein the water nozzles include at least one outside water nozzle arranged to wash an outside of the waste container and at least one inside water nozzle arranged to wash an inside of the waste container;
    a grey water reservoir which receives water previously used by the nozzles during waste container washing;
    a water pumping circuit interconnecting both the grey water reservoir and the clean water reservoir to the water nozzles and operable to pump water to the nozzles selectively from either one of the grey water reservoir and the clean water reservoir; and
    a guide rail having a waste container carriage movably mounted to it to carry a waste container along a washing path leading into, and back out from the container washing compartment, the waste container washing path having
    a starting position in which the waste container is attachable to the carriage in an upright orientation outside the washing compartment, from which starting position the waste container is raised by the carriage as it is moved upwardly along the guide rail along a first portion of the washing path,
    a second portion of the washing path where the carried waste container is flipped over a correspondingly curved portion of the guide rail, into the washing compartment,
    a third portion where the carried waste container is translated downwardly along a substantially linear path in the washing compartment from an upper position distal from the at least one inside water nozzle and a lower position proximal to the at least one inside water nozzle and submitted inside and outside thereof to water jets by the water nozzles along its entire height;
    wherein a waste container positioned in the washing compartment can be washed with a two-phase cycle, a first phase during which water is pumped to the nozzles from the grey water reservoir, and a second phase during which water is pumped to the nozzles from the clean water reservoir.

13. The waste container washing vehicle of claim 12 wherein, in the third portion of the washing path, the carried waste container is washed with water pumped from the grey water reservoir while being moved towards the water nozzles and is washed with water pumped from the clean water reservoir while being moved away from the water nozzles.

14. The waste container washing vehicle of claim 12 wherein said carried waste container is translated in an upside-down orientation towards and, away from the at least one inside water nozzle in the third portion of the washing path and wherein the at least one inside water nozzle is contained in said carried waste container in the lower position of the third portion of the washing path and the at least one inside water nozzle is located outside said carried waste container in the upper position of the third portion of the washing path.

15. The waste container washing vehicle of claim 12 wherein the container washing compartment further comprises a lid guide positioned to maintain a lid of the waste container in an open position in the container washing compartment by abutment.

16. A waste container washing vehicle comprising
    a guide rail having a waste container carriage movably mounted to it to carry a waste container along a washing path leading into, and back out from a container washing compartment of the vehicle, the waste container washing path having:
    a starting position in which the waste container is attachable to the carriage in an upright orientation, outside the washing compartment, from which starting position the waste container is raised by the carriage as it is moved upwardly along the guide rail along a first portion of the washing path;
    a second portion of the washing path where the carried waste container is flipped over a correspondingly curved portion of the guide rail, into the washing compartment; and
    a third portion where the carried waste container is translated downwardly in the washing compartment towards at least one inside water nozzle from an upper position wherein the at least one inside water nozzle is located outside the carried waste container and a lower position wherein the at least one inside water nozzle is contained in the carried waste container and submitted inside and outside thereof to water jets by the at least one inside water nozzle and at least one outside water nozzle along its entire height.

17. The waste container washing vehicle of claim 16 wherein said carried waste container is translated in an upside-down orientation along a substantially linear path towards and away from the at least one inside water nozzle in the third portion of the washing path and wherein the at least one inside water nozzle is proximal to a bottom surface of the waste container in the lower position of the third portion of the washing path and distal from the bottom surface of the waste container in the upper position of the third portion of the washing path.

18. The waste container washing vehicle of claim 16 wherein the container washing compartment further comprises a lid guide positioned to maintain a lid of the waste container in an open position in the container washing compartment by abutment and the lid of the waste container is pivoted in the open position in the starting position.

19. A waste container washing system comprising:
    a clean water reservoir;
    a container washing compartment having a plurality of water nozzles arranged for washing a waste container positionable therein, the water nozzles including at least one inside water nozzle insertable in the waste container and at least one outside water nozzle;
    a grey water reservoir which receives water previously used by the nozzles during waste container washing;

a water pumping circuit interconnecting both the grey water reservoir and the clean water reservoir to the water nozzles and operable to pump water to the water nozzles selectively from either one of the grey water reservoir and the clean water reservoir; and a guiding rail having a waste container carriage movably mounted to it to carry the waste container along a washing path, wherein the waste container secured to the waste container carriage is translatable downwardly in the container washing compartment towards and away from the water nozzles from an upper position wherein the at least one inside water nozzle is located outside the waste container to a lower position wherein the at least one inside water nozzle is contained in the waste container and submitted to water jets by the water nozzles along its entire height.

20. The waste container washing system of claim 19 wherein the waste container is washed with water pumped from grey water reservoir while being moved towards the water nozzles and is washed with water pumped from clean water reservoir while being moved away from the water nozzles in the container washing compartment.

21. The waste container washing system of claim 19 wherein the container washing compartment further comprises a lid guide positioned to maintain a lid of the waste container in an open position in the container washing compartment by abutment.

22. The waste container washing system of claim 19 wherein the waste container is translatable in an upside-down orientation along a substantially linear path towards and away from the water nozzles in the container washing compartment and wherein the at least one inside water nozzle is proximal to a bottom surface of the waste container in the lower position and distal from the bottom surface of the waste container in the upper position.

23. A waste container washing vehicle comprising a guide rail having a waste container carriage movably mounted to it to carry a waste container along a washing path leading into, and back out from a container washing compartment of the vehicle, the waste container washing path comprising: an outside portion provided outside the washing compartment from which the waste container is carried in the container washing compartment and an inside portion of the washing path where the carried waste container is translated downwardly along a substantially linear path in the washing compartment towards and away from at least one inside water nozzle and submitted inside and outside thereof to water jets by water nozzles along its entire height.

24. The waste container washing vehicle of claim 23 wherein the waste container is translatable towards and away in an upside-down orientation from the water nozzles in the container washing compartment and wherein the at least one inside water nozzle is contained in the waste container in a lower position of the inside portion of the washing path and the at least one inside water nozzle is located outside the waste container in an upper position of the inside portion of the washing path.

25. The waste container washing vehicle of claim 23 wherein the container washing compartment further comprises a lid guide positioned to maintain a lid of the waste container in an open position, in the container washing compartment by abutment.

26. The waste container washing vehicle of claim 23 further comprising a clean water reservoir; a grey water reservoir which receives water previously used by the nozzles during waste container washing; and a water pumping circuit interconnecting both the grey water reservoir and the clean water reservoir to the water nozzles and operable to pump water to the water nozzles selectively from either one of the grey water reservoir and the clean water reservoir.

\* \* \* \* \*